Patented May 26, 1942

2,284,577

UNITED STATES PATENT OFFICE 2,284,577

VULCANIZATION OF RUBBER

Paul C. Jones and Roger A. Mathes, Akron, Ohio, assignors to The B. F. Goodrich Company, New York, N. Y., a corporation of New York No Drawing. Application February 8, 1939, Serial No. 255,357

14 Claims. (Cl. 260—788)

This invention relates to the vulcanization of rubber, and to rubber compositions vulcanized in the presence of the accelerators herein described.

It has long been known that rubber may be vulcanized in reduced times in the presence of materials commonly called accelerators. It is an object of this invention to provide a new and exceedingly effective class of accelerators.

It has previously been observed that the class of compounds known as 2-mercaptothiazolines, of which the simplest member has the structural formula

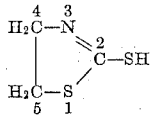

are poor accelerators of vulcanization.

We have disclosed in our copending application Serial No. 255,358, filed February 8, 1939, that 2-mercaptothiazolines are good accelerators when employed in the presence of carboxylic acids and their metallic salts.

Although the quaternary ammonium salts of 2-mercaptothiazolines are known to exist, we have found that, in general, the amine salts of 2-mercaptothiazolines cannot be prepared. The tendency for 2-mercaptothiazolines to combine with mono-amine bases as strong as diethylamine and cyclohexylamine is so slight that it has not been possible to isolate the diethylammonium or cyclohexyl-ammonium salts of 2-mercaptothiazoline.

We have now discovered that the polyamine salts of 2-mercaptothiazoline may be prepared and isolated, and that these materials are excellent accelerators of vulcanization, even in the absence of any carboxylic acid.

A wide variety of polyamine salts of 2-mercaptothiazoline or related compounds containing substituents other than hydrogen on the carbon atoms may be employed. It is preferred to employ aliphatic polyamines containing two or more primary amino groups such as ethylene diamine, butylene diamine, 1,4-diamino cyclohexane, 1,3,5-triamino cyclohexane, tri-aminoethyl amine, di(beta-aminoethyl) amine, triethylene tetramine, etc. Aromatic polyamines containing at least two primary amino groups such as phenylene diamine (ortho, meta, or para), naphthylene diamine (1,2-, 1,4-, 1,5-, 1,6-, 1,7-, 1,8-, 2,3-, or 2,6-,), benzidine, tolidine (ortho, meta, or para), etc., may also be used.

Amides and amidines such as urea and guanidine containing $NH_2$ groups separated by groups other than hydrocarbon constituents are not included within the scope of this invention since they are not true polyamines.

The products of this invention are prepared by the ordinary methods well known to the art. Thus, when alcoholic solutions of 2-mercaptothiazoline and ethylene diamine are mixed in 1:1 or 2:1 ratio, an exothermic reaction occurs, and the product is isolated as a viscous syrup. The salts of the higher amines such as triethylene tetramine may be formed by reacting 2-mercaptothiazoline and triethylene tetramine in equimolar ratios, or in higher ratios such as 2:1, 3:1, or 4:1.

Rubber compositions accelerated with the polyamino salts of 2-mercaptothiazolines exhibit a very flat rate of cure, an advantage not possessed by either polyamines or 2-mercaptothiazolines when employed as accelerators. The outstanding performance of the accelerators of this invention in this respect is illustrated by tests in which a rubber composition containing rubber 100 parts by weight, zinc oxide 5 parts, sulfur 3 parts, stearic acid 1 part, and 1 part of the 1:1 salt of 2-mercaptothiazoline and triethylene tetramine was prepared. When the composition was cured in a heated mold for varying times at 287° F., compositions having the following tensile strengths in lbs. per square inch and elongations in percent were obtained:

| Time of cure in minutes | T | E |
| --- | --- | --- |
| 30 | 4,035 | 735 |
| 45 | 4,375 | 720 |
| 60 | 4,125 | 700 |
| 90 | 4,035 | 695 |

It can be seen that this composition exhibited a remarkable freedom from overcure, even in 90 minutes at 287° F. Similar results are obtained with other accelerators within the scope of this invention.

It is not essential to the successful practice of my invention that the salts be prepared prior to the incorporation in the rubber composition. Thus, if 2-mercaptothiazoline and ethylene diamine are incorporated in a rubber composition, the salt will be formed in situ during vulcanization and the rate of cure of the composition will approximate that which would have been obtained had the salt been prepared before incorporation in the rubber. It is believed, though we do not wish to be bound by our theory, that the polyamines may be regarded as activators for the 2-mercapto-thiazolines. It has been observed that other basic nitrogenous accelerators which do not require acidic activation such as diphenyl guanidine react in the same manner as the polyamine. It has been noted, however, that compositions having the extraordinary resistance to overcure exhibited by the vulcanizates of this invention are not produced by any of the other salts of 2-mercaptothiazolines with bases within the class mentioned.

Although the use of the accelerators of this invention has been described in detail in connection with specific rubber compositions, it will be evident that this invention is applicable to rubber compositions of the most varied nature, and that all manner of rubber goods including pneumatic and solid rubber tires, tubes, hose, belting, packing, boots and shoes, surgical rubber goods, seamless dipped rubber articles, etc. may be vulcanized in the presence of the accelerators herein described. The accelerator may be incorporated in the rubber by mastication, milling or any similar process, or in the case of latex, rubber cement, or any other natural or artificial dispersion or solution of rubber by simply dissolving or suspending the accelerator therein.

The vulcanization may be performed in other manners than that particularly set forth in the specific examples; specifically, rubber compositions may be heated in the presence of sulfur or selenium in hot air, steam, hot water, etc.

It is to be understood that the term "a rubber" is employed in the appended claims in a generic sense to designate those rubbery materials which are vulcanizable with sulfur, including caoutchouc, balata, gutta percha, latex, rubber isomers, or synthetic rubber whether or not admixed with pigments, fillers, softeners, antioxidants, other accelerators, etc., but not including materials incapable of vulcanization by reaction with sulfur.

While we have herein disclosed specific embodiments of our invention, we do not intend to limit ourselves solely thereto, for it will be obvious to those skilled in the art that many modifications such as using other materials having equivalent properties and varying the proportions of materials used are within the spirit and scope of the invention as defined in the appended claims.

We claim:

1. The process which comprises vulcanizing a rubber in the presence of a salt in which a 2-mercaptothiazoline is combined with a polyamine containing at least two primary amino groups.

2. The process which comprises vulcanizing a rubber in the presence of a salt in which a 2-mercaptothiazoline is combined with an aliphatic polyamine containing at least two primary amino groups.

3. The process which comprises vulcanizing a rubber in the presence of alkylene diamine salt of 2-mercaptothiazoline.

4. The process which comprises vulcanizing a rubber in the presence of an ethylene diamine salt of 2-mercaptothiazoline.

5. The process which comprises vulcanizing a rubber in the presence of a trialkylene tetramine salt of 2-mercaptothiazoline.

6. The process which comprises vulcanizing a rubber in the presence of a triethylene tetramine salt of 2-mercaptothiazoline.

7. A rubber which has been vulcanized in the presence of a salt in which a 2-mercaptothiazoline is combined with a polyamine containing at least two primary amino groups.

8. A rubber which has been vulcanized in the presence of a salt in which a 2-mercaptothiazoline is combined with an aliphatic polyamine containing at least two primary amino groups.

9. A rubber which has been vulcanized in the presence of an alkylene diamine salt of 2-mercaptothiazoline.

10. A rubber which has been vulcanized in the presence of an ethylene diamine salt of 2-mercaptothiazoline.

11. A rubber which has been vulcanized in the presence of a trialkylene tetramine salt of 2-mercaptothiazoline.

12. A rubber which has been vulcanized in the presence of a triethylene tetramine salt of 2-mercaptothiazoline.

13. The process which comprises vulcanizing a rubber in the presence of a polyethylene polyamine salt of 2-mercaptothiazoline.

14. A rubber which has been vulcanized in the presence of a polyethylene polyamine salt of 2-mercapthiazoline.

PAUL C. JONES.
ROGER A. MATHES.